(12) United States Patent
Kuznia et al.

(10) Patent No.: US 7,478,560 B2
(45) Date of Patent: Jan. 20, 2009

(54) SENSOR APPARATUS RESPONSIVE TO PRESSURE AND TEMPERATURE WITHIN A VESSEL

(75) Inventors: Philip D. Kuznia, Carmel, IN (US); Paul J. Pitzer, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 1 day.

(21) Appl. No.: 11/715,689

(22) Filed: Mar. 8, 2007

(65) Prior Publication Data

US 2008/0216580 A1   Sep. 11, 2008

(51) Int. Cl.
*G01L 9/12* (2006.01)
(52) U.S. Cl. .............................. 73/724; 73/708; 73/753; 73/756
(58) Field of Classification Search ........... 73/700–756; 361/283.1–283.4
See application file for complete search history.

(56) References Cited

U.S. PATENT DOCUMENTS

| | | | | |
|---|---|---|---|---|
| 5,948,989 A | * | 9/1999 | Ichikawa et al. | 73/708 |
| 6,053,049 A | * | 4/2000 | Chen et al. | 73/756 |
| 6,125,707 A | * | 10/2000 | Haga et al. | 73/745 |
| 6,142,020 A | * | 11/2000 | Kim et al. | 73/714 |
| 6,267,010 B1 | * | 7/2001 | Hatanaka et al. | 73/756 |
| 6,964,200 B2 | * | 11/2005 | Miyazaki et al. | 73/754 |
| 7,216,546 B2 | * | 5/2007 | Hayashi et al. | 73/708 |

FOREIGN PATENT DOCUMENTS

EP   1096241 A1 * 5/2001

OTHER PUBLICATIONS

Delphi Corporation product description on Delphi website—(http://ppd.delphi.com/pdf/ppd/sensors/et_mapmat.pdf).

* cited by examiner

*Primary Examiner*—Edward Lefkowitz
*Assistant Examiner*—Jermaine Jenkins
(74) *Attorney, Agent, or Firm*—Jimmy L. Funke

(57) ABSTRACT

A sensor apparatus includes pressure and temperature sensors for measuring the pressure and temperature of high-pressure fluid media within a vessel. The pressure sensor is disposed in a sensor cavity that is coupled to a measurement port, and the leads of a temperature sensor that is disposed in the measurement port pass through the body of the sensor apparatus to a termination cavity that is physically isolated from the sensor cavity.

4 Claims, 3 Drawing Sheets

SENSOR APPARATUS RESPONSIVE TO PRESSURE AND TEMPERATURE WITHIN A VESSEL

TECHNICAL FIELD

The present invention relates to a sensor package designed to mount on the wall of a vessel for measuring both the pressure and temperature of a fluid media within the vessel.

BACKGROUND OF THE INVENTION

Combining both a pressure sensor and a temperature sensor in a single package can reduce overall sensor cost in control or telemetry applications where it is necessary to measure more than one parameter of fluid media in a vessel. For example, various automotive suppliers produce and sell sensors designed to mount on the intake manifold of an internal combustion engine for measuring both the absolute pressure (MAP) and the temperature (MAT) of air in the manifold. Typically, the sensor package includes a measurement port that passes through a wall of the intake manifold into the manifold air stream, and a pressure sensor sealed against the inboard end of the port. The manifold air temperature is measured by a thermistor disposed in the manifold air stream but within the port, and the leads of the thermistor are terminated in the sensor package adjacent the pressure sensor. One example of such a sensor is the MAP/MAT Sensor manufactured and marketed by Delphi Corporation.

While the above-described sensor configuration can be used to advantage in low-pressure applications (i.e., 15 p.s.i. or less), it is problematic in high-pressure applications (such as a turbocharged engine) due to the difficulty of forming a leak-free seal around the leads of the thermistor, even if the sensor housing is molded around the leads. Leakage around the sensor leads is undesirable not only because of manifold air pressure loss, but also because the manifold air (or other media) can contaminate the pressure sensor and associated electronic devices. Accordingly, what is needed is a combined pressure/temperature sensor that is particularly suited to high-pressure applications.

SUMMARY OF THE INVENTION

The present invention provides an improved sensor apparatus including pressure and temperature sensors for sensing the pressure and temperature of high-pressure fluid media in a vessel such as an engine intake manifold. The apparatus includes a measurement port, a sensor cavity coupled to the measurement port for housing the pressure sensor, and a termination cavity that is physically isolated from the sensor cavity. The temperature sensor is disposed in the measurement port, and its electrical leads pass through the body of the sensor apparatus and into the termination cavity for connection to leadframe terminals of the sensor apparatus.

DESCRIPTION OF THE PREFERRED EMBODIMENT

As indicated above, the sensor apparatus of the present invention is disclosed herein in the context of a MAP/MAT sensor for an internal combustion engine. However, it should be recognized that the sensor apparatus can be used in other sensing applications, vehicular or non-vehicular, where the temperature and pressure of a media in a vessel are to be measured.

Figure 1:
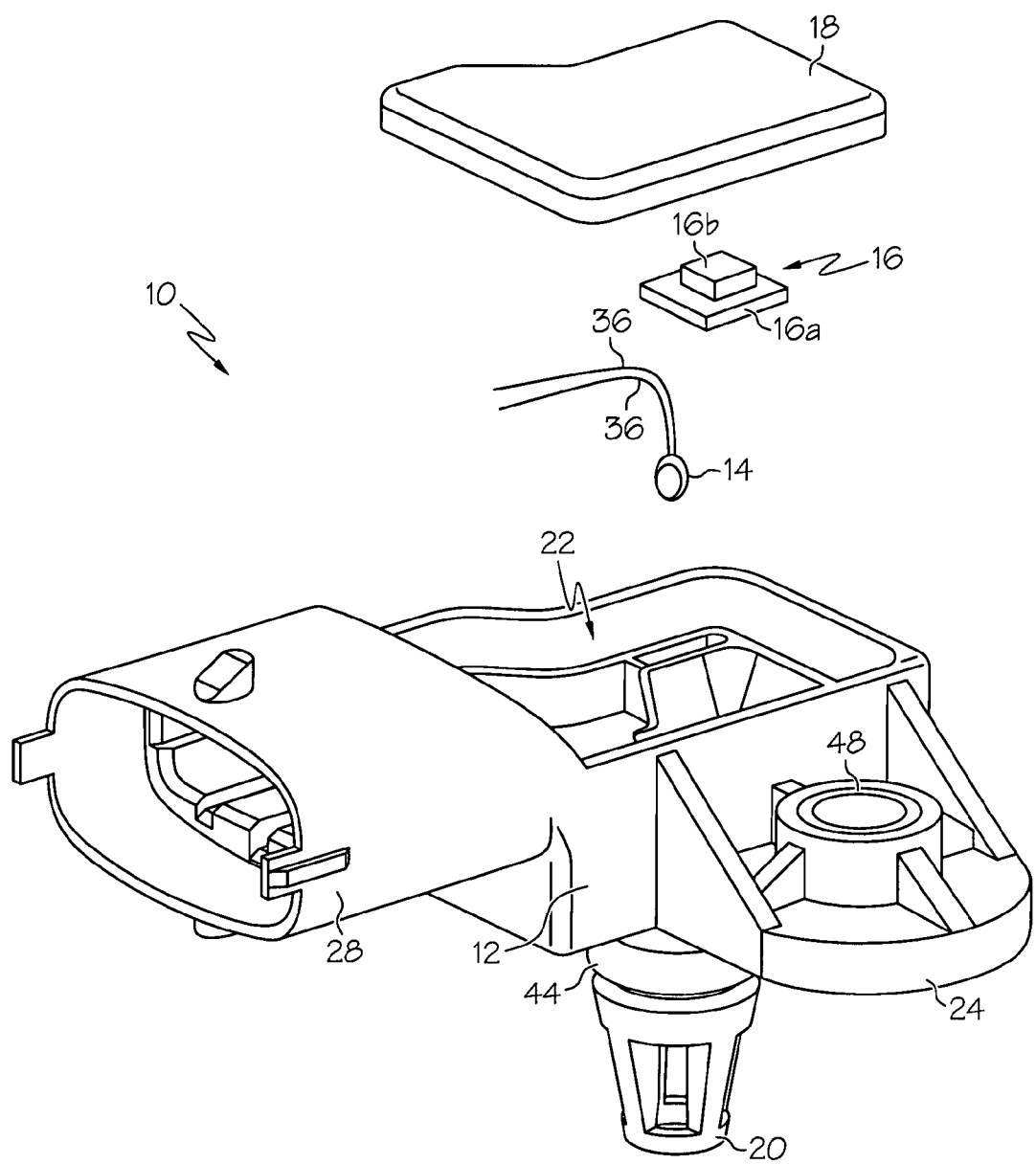
FIG. 1 is an exploded isometric view of a sensor apparatus according to this invention.
Figure 2:
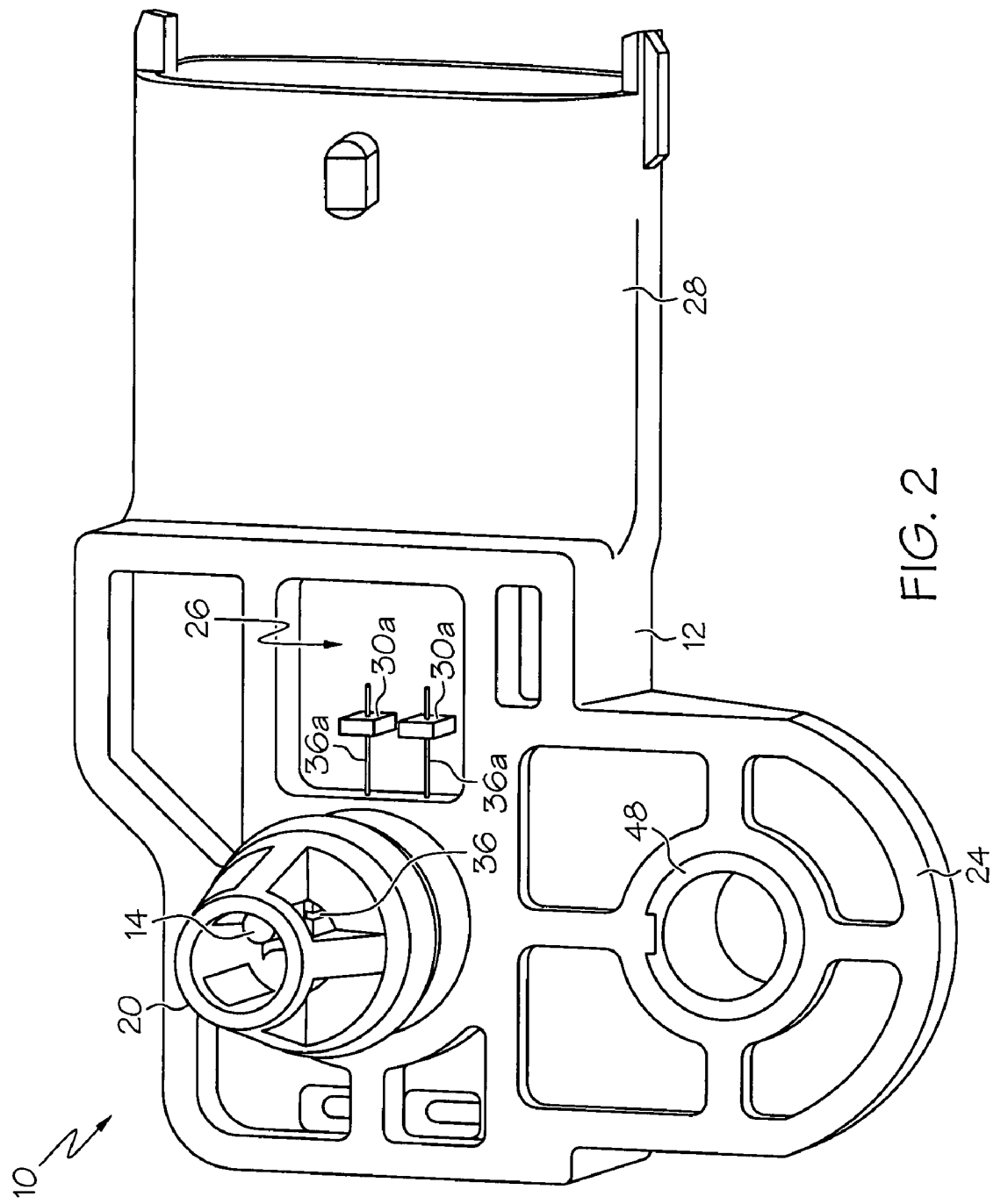
FIG. 2 is a bottom isometric view of the sensor apparatus of FIG. 1.
Figure 3:
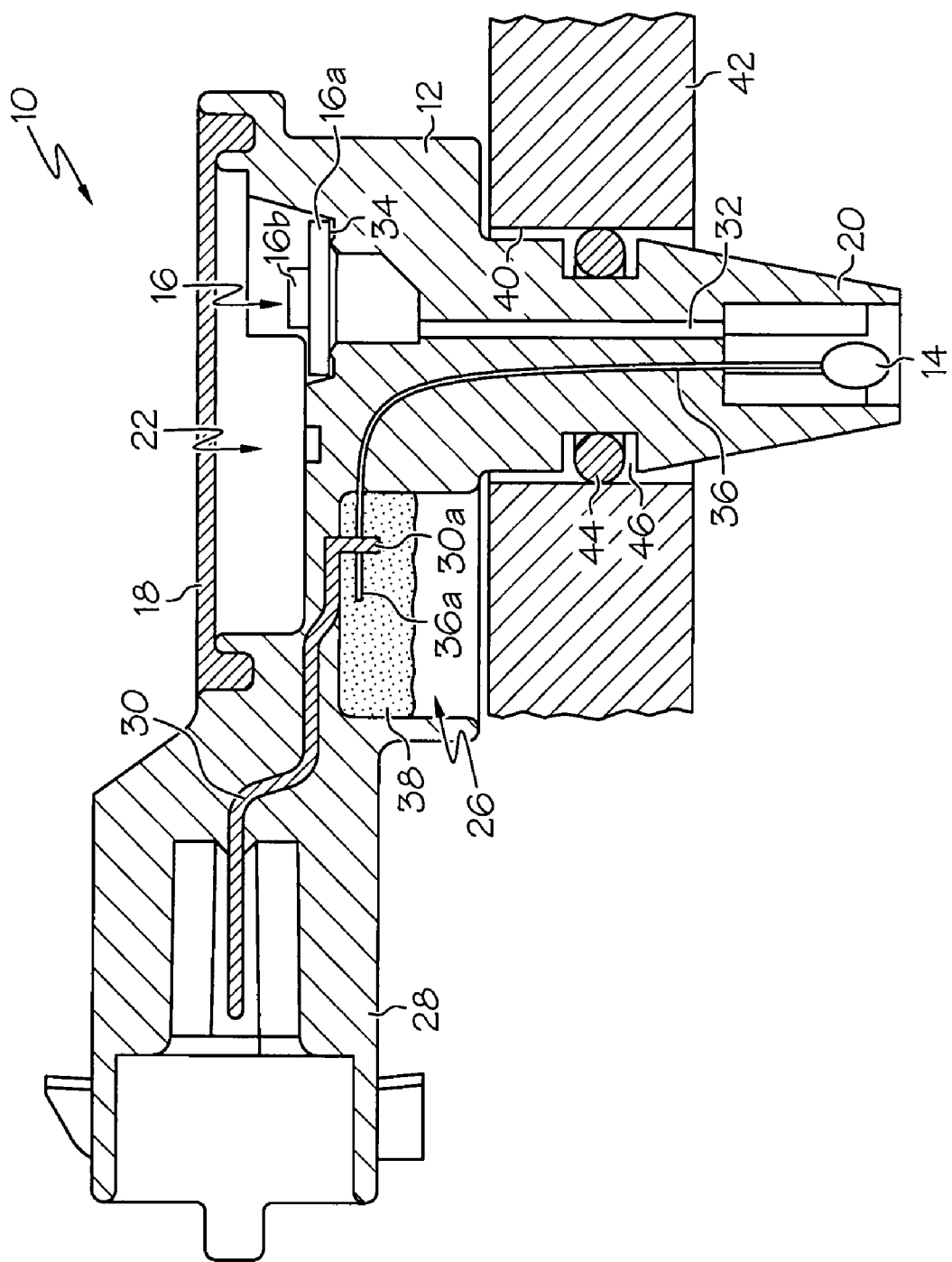
FIG. 3 is a cross-sectional view of the sensor apparatus of FIGS. 1-2.

Referring to FIGS. 1-3, the reference numeral 10 generally designates a sensor apparatus according to this invention for sensing both MAP and MAT in an internal combustion engine. The sensor apparatus 10 includes a molded plastic housing 12, a leaded thermistor 14, an electronic pressure sensor package 16 (including a pressure sensor 16a and signal processing chip 16b) and a plastic cover 18. The molded housing 12 includes a measurement port 20, a sensor cavity 22, an attachment lug 24, a termination cavity 26, a connector shroud 28, and a set of four insert-molded electrical terminals 30 that extend into the connector shroud 28 for engaging the terminals of mating connector (not shown). As shown in FIG. 3, the measurement port 20 is coupled to the sensor cavity 22 by an internal housing passage 32, and the pressure sensor package 16 is mounted on a shelf 34 in the sensor cavity 22 so that the pressure sensor 16a is responsive to the media pressure in measurement port 20 and seals off the housing passage 32. As shown in FIGS. 2-3, the thermistor 14 is disposed in the outboard end of measurement port 20, and its leads 36 pass through the body of housing 12 with the end portions 36a extending into the termination cavity 26. The leads 36 may be insert-molded in the housing 12, or alternatively, manually inserted through small passages molded in the body of housing 12. Of the four terminals 30, three have end portions (not shown) that extend into the sensor cavity 22 for attachment to the pressure sensor package 16 (by wire bonding, for example), and two have end portions 30a that extend into termination cavity 26 for attachment (by soldering, for example) to the thermistor lead end portions 36a as illustrated in FIGS. 2-3. The pressure sensor package 16 and its electrical connections may be passivated with a suitable sealant (not shown) if desired, and the cover 18 seals the sensor cavity 22 from atmospheric contamination. A sealant 38 such as silicone dispensed into termination cavity 26 covers the terminal end portions 30a and thermistor lead end portions 36a as shown in FIG. 3.

Referring to FIG. 3, the sensor apparatus 10 is installed on an engine by inserting the measurement port 20 through a circular opening 40 formed in the wall 42 of the engine's intake manifold. An O-ring 44 retained in an annular recess 46 of measurement port 20 forms a seal between the sensor apparatus 10 and the intake manifold wall 42. The sensor apparatus 10 is retained in place by a bolt (not shown) that passes through an opening in the mounting lug 24 and threads into the intake manifold wall 42. A metal bushing 48 insert-molded in the lug opening bears the compressive force of the attachment bolt. The outboard end of measurement port 20 is thereby placed in the air stream within the intake manifold wall 42 to facilitate accurate MAP and MAT measurement.

By physically isolating the thermistor leads 36 and their electrical terminations from the sensor cavity 22, the sensor apparatus 10 overcomes the leakage issue associated with prior art sensors, making the sensor apparatus 10 suitable for high pressure applications involving media at 100 p.s.i. or higher. The sealant 38 seals the manifold air leakage paths (around thermistor leads 36) between measurement port 20 and the termination cavity 26, and even if some leakage occurs it is physically isolated from the sensor cavity 22 to prevent contamination of the pressure sensor package 16. Furthermore, the sensor cavity 22 and termination cavity 26 are formed on opposite sides of the housing 12 to enable at least partial over-lapping of the two cavities 22 and 26 in the direction of sensor insertion as shown in FIG. 3 to minimize the footprint of housing 12 on the intake manifold.

While the sensor apparatus of the present invention has been described with respect to the illustrated embodiment, it is recognized that numerous modifications and variations in addition to those mentioned herein will occur to those skilled in the art. For example, a different kind of temperature responsive element may be used in place of thermistor 14, and so on. Accordingly, it is intended that the invention not be limited to the disclosed embodiment, but that it have the full scope permitted by the language of the following claims.

The invention claimed is:

1. A sensor apparatus for sensing a pressure and temperature of a fluid media within a vessel, comprising:
 a molded plastic housing including a measurement port that is inserted into said fluid media through a wall of said vessel, a sensor cavity coupled to said measurement port by a media conducting passage, and a termination cavity that is physically isolated from said sensor cavity;
 a pressure sensor mounted in said sensor cavity in sealing relation with respect to said media conducting passage to measure the pressure of said fluid media;
 a temperature sensor including a sensing element in contact with the fluid media within said measurement port to measure the temperature of said fluid media, and one or more electrical leads with end portions that extend into said termination cavity without passing through said sensor cavity; and
 a set of electrical terminals molded into said housing for electrical connection to said pressure and temperature sensors, including one or more electrical terminals having end portions that extend into said termination cavity for attachment to the end portions of said electrical leads.

2. The sensor apparatus of claim 1, further comprising:
 a sealant dispensed in said termination cavity for sealing around the end portions of said electrical terminals and the end portions of said electrical leads.

3. The sensor apparatus of claim 1, where the electrical leads of said temperature sensor pass through said molded plastic housing and into said termination cavity without passing through said sensor cavity.

4. The sensor apparatus of claim 1, where said sensor cavity and said termination cavity are oppositely disposed about said housing and at least partially overlapping in a direction of insertion of said measurement port into said fluid media.

* * * * *